May 31, 1927.  
F. A. DILLINGHAM  
WINDSHIELD  
Filed May 28, 1924  
1,630,330  
2 Sheets-Sheet 2

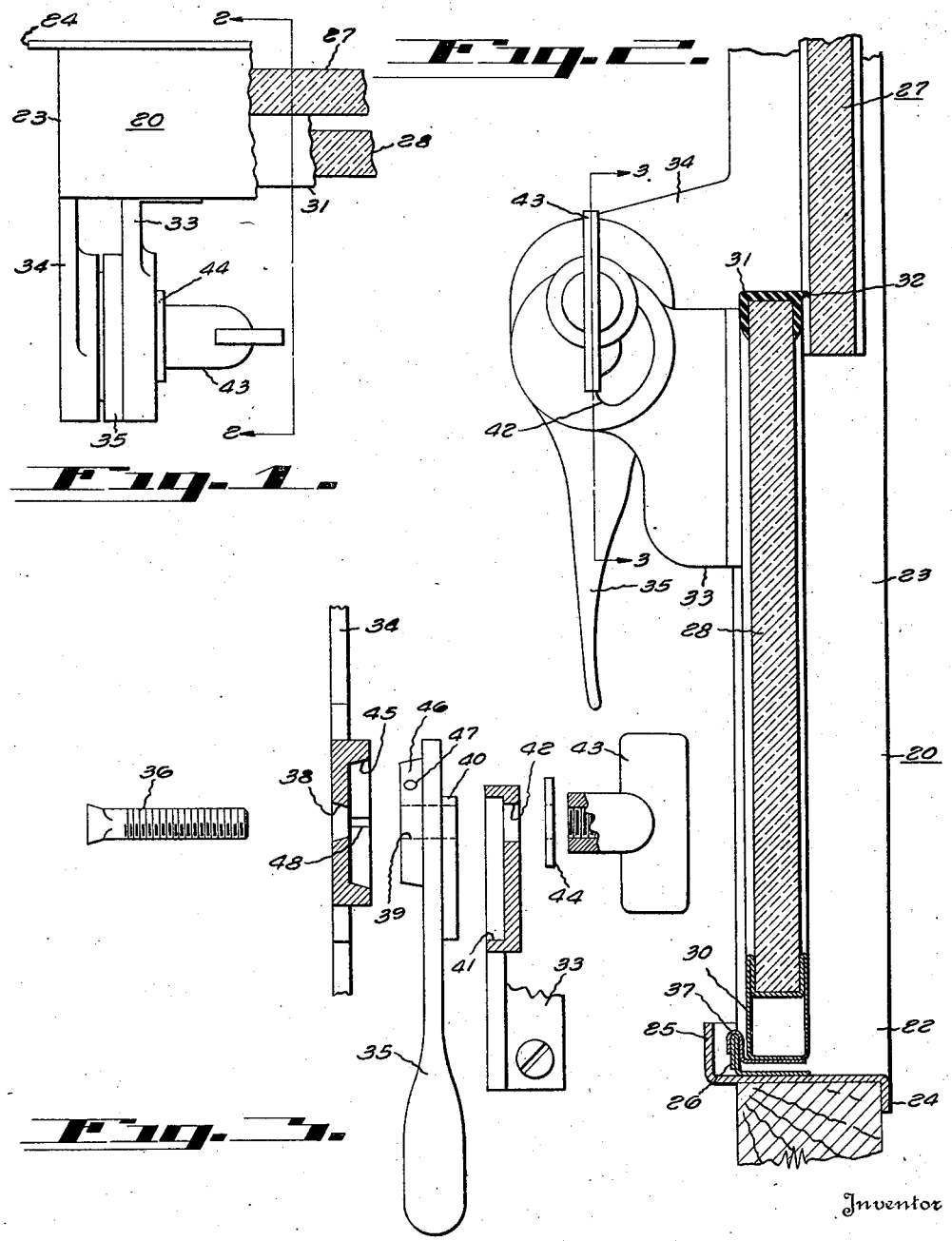

Inventor  
Frederick A. Dillingham  
By Maréchal & Fehr  
Attorneys

Patented May 31, 1927.

1,630,330

UNITED STATES PATENT OFFICE.

FREDERICK A. DILLINGHAM, OF TROY, OHIO, ASSIGNOR TO THE TROY SUNSHADE COMPANY, OF TROY, OHIO, A CORPORATION OF OHIO.

WINDSHIELD.

Application filed May 28, 1924. Serial No. 716,380.

The invention relates to windshields and more particularly to windshields of the ventilating type adapted for use in automobiles.

One of the principal objects of the present invention is to provide a windshield having improved means for operating it and for securing it in any desired position.

Other objects will be apparent from the following description taken in connection with the accompanying drawings in which:

Fig. 1 is a plan view of one end of a windshield embodying the present invention;

Fig. 2 is a vertical section of the lower portion of the windshield taken on the line 2—2 of Fig. 1;

Fig. 3 is an exploded view of the operating and securing means taken on the line 3—3 of Fig. 2, certain of the parts being shown in elevation;

Figure 4:
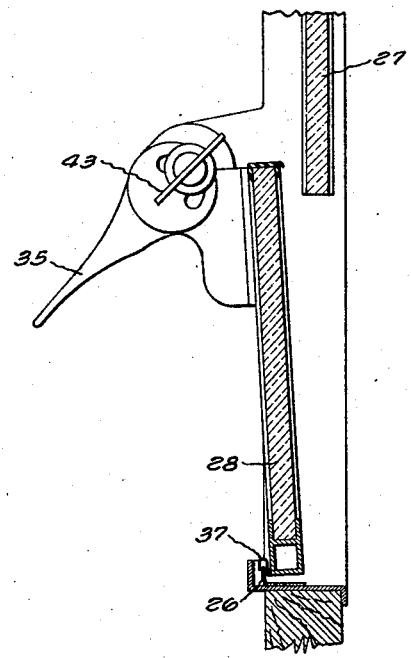
Figure 5:
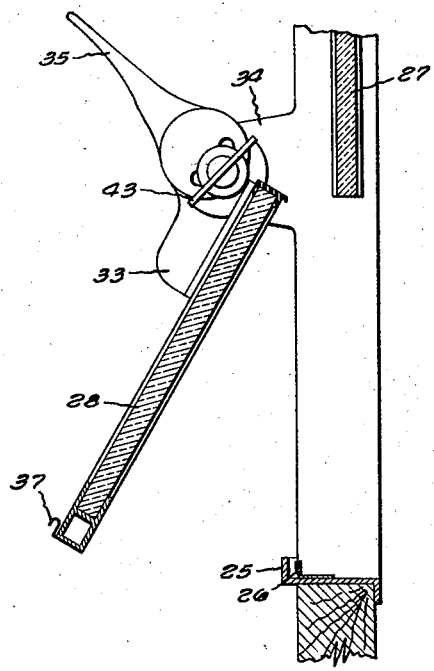
Figure 6:
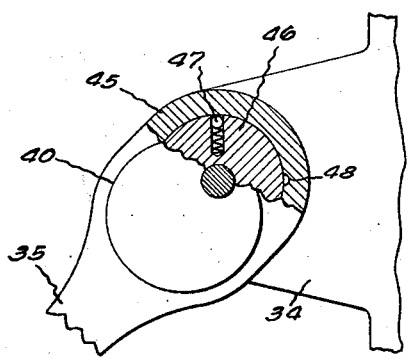
Figure 7:
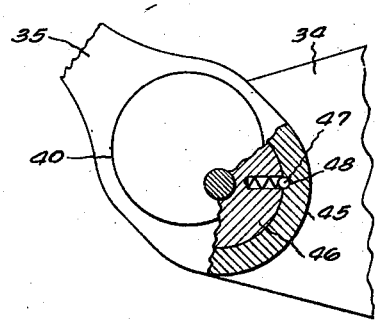

Figs. 4 and 5 are vertical sectional views similar to Fig. 2 showing two operating positions of the windshield and the operating lever; and Figs. 6 and 7 are fragmentary part-sectional views of the operating means, corresponding to the positions thereof in Figs. 4 and 5 respectively.

One of the objections to known types of windshields is the difficulty commonly encountered in operating and securing the lower windshield section in the desired position, particularly while the automobile is running, and this difficulty is overcome by the novel operating and securing mechanism forming the subject matter of the present invention.

Referring to Figs. 1 and 2 of the drawings, the body member 20 of the windshield consists of a top member 21, a bottom or sill member 22 and side posts 23 extending vertically between the top member and the bottom member to form a framelike structure, which is adapted to be set into the body of an automobile, as is well understood by those skilled in the art. In the form of windshield herein shown, the body member is provided throughout the entire periphery of its front or outside face with an outturned flange 24 which is adapted to seat against the outer surface of the automobile body in which the windshield is placed. The bottom or sill member 22 is provided at its inner edge with an upturned flange 25 which serves to catch any water which may leak through the windshield, and also a fence 26 which is adapted to enter or seat in a groove in the lower windshield section.

The windshield is provided with the usual upper and lower windshield sections which fit in and are adapted to move in the framework of the body member 20. The upper windshield section 27 is pivoted (pivot not shown) in the upper portion of the body member and is adapted to swing forwardly or outwardly from the closed position as shown in Fig. 2. The lower windshield section 28 is pivotally supported at its upper end and is adapted to swing inwardly from the closed position shown in Fig. 2. The lower windshield section consists of a pane of glass 29 mounted in frame member 30 which bounds the lower edge and sides of the pane of glass. Secured over the upper edge of the glass there is a rubber strip 31 having a downturned lip 32 which is adapted to engage the surface of the glass carried in the upper windshield section thereby preventing the ingress of air and rain between the glass of the upper and lower windshield sections. The lower edge of the lower section 28 carries a grooved member 37 which receives the fence 26 therein. When the lower windshield section is properly seated in closed position it bears firmly on the fence 26 and cooperates with the side posts and upper windshield section in such a way as to prevent the ingress of air or water. While the body member 20 is herein shown and described as a frame-like structure it will be understood that the body member is not limited to a frame-like structure but may take any convenient or desired form suitable for mounting on any type of automobile body structure.

The means for swingingly supporting and for operating the lower windshield section will now be described. In the drawing there is illustrated only the supporting and operating means for the left side of the lower windshield section. It will be understood, however, that there is a similar supporting and operating means for the right hand side of this section, the parts of course, being reversed so as to be readily accessible from the driver's compartment of the automobile. A frame bracket 33 is secured to the upper portion of the frame of the lower windshield section and adjacent thereto is a body bracket 34 which is secured to the side post of the windshield body. An operating lever 35 is interposed between the body bracket 34 and the frame bracket 33, the two brackets and the operating lever being held together by means of a screw-threaded bolt 36 which passes through suitable openings in the brackets and the operating lever and is adapted to receive a thumb nut 43 on its screw-threaded portion for holding the parts in assembled relation and also for binding them together.

The bolt 36 has a squared tapered head which is received in the squared tapered opening 38 in the body bracket, and the bolt is therefore held against rotation with respect to the body bracket 34. The lever arm 35 receives the bolt 36 in the opening 39 and is adapted to rotate freely about the bolt 36 as a center. The operating lever 35 carries on one side an eccentrically disposed circular boss or cam member 40 which fits into a correspondingly shaped socket 41 formed in the frame bracket 33. Rotary motion of the operating lever 35 about the bolt 36 thus causes movement of the frame bracket 33 transversely to, that is, at right angles to the bolt 36. To accommodate such movement the frame bracket is provided with an arcuate slot 42 through which the bolt 36 passes. For the purpose of holding together the body bracket, the operating lever and the frame bracket, the bolt 36 is provided with a thumb nut 43 and the washer 44 is disposed between the thumb nut and the frame bracket 33. In order to positively bind or lock together the frame bracket 34 and the operating lever 35, these two parts are provided with interfitting cone shaped friction means consisting of a socket member 45 formed in the body bracket 34 and a boss member 46 carried by the operating lever 35. The tapering surfaces of these interfitting cone members 45 and 46 are disposed at an angle of ten degrees from the axis of the bolt 36, it being found that this is the angle best adapted for the present purpose since the interfitting parts 45 and 46 may be firmly held or wedged together by tightening up the wing nut 43, and are at the same time readily loosened or separated merely by unscrewing this wing nut. To yieldingly lock the operating lever 35 in elevated position while the windshield is being adjusted the boss 46 is provided with a spring pressed ball or plunger 47 which is adapted to cooperate with a notch or depression 48 formed on the inner cone surface of the part 45.

The purpose of the interfitting cone members 45 and 46, and the spring pressed plunger 47 and cooperating notch 48 may best be understood from a description of the operation of the invention, and for this purpose reference is made particularly to Figs. 4 to 7. As already stated, when the windshield is closed the upper and lower windshield sections are in the position shown in Fig. 2, in which position the operating lever 35 is directed downwardly, and the wing nut 43 is screwed down to hold the parts firmly locked in position. When it is desired to open the lower section of the windshield the wing nut 43 is loosened and the operating lever 35 is moved inwardly towards the driver's compartment as indicated in Fig. 4. The eccentric or cam 40 being directly under the bolt 36 the first effect is to draw the upper portion of the lower windshield section inwardly away from the upper windshield section. At the same time the lower windshield section is raised slightly from its seat, as indicated at 37 in Fig. 4. Upon continued inward and upward movement of the operating handle 35 the lower windshield section 28 is raised sufficiently to entirely clear the fence 26 and the flange 25 whereupon it swings inwardly as shown in Fig. 5, the lower section being so hung or proportioned that when it is allowed to swing freely it takes the position shown in Fig. 5. In opening the windshield the operating levers 35 at opposite ends of the lower windshield section may be moved simultaneously or one after the other, as when the car is in motion and when only one hand is available for the purpose. When the operating lever 35 reaches the elevated position shown in Fig. 5 the spring pressed plunger or ball 47 seats in the depression 48 and therefore yieldingly holds or locks the lever member in elevated position. If greater or less opening of the lower windshield section is desired it may be readily moved into any such desired position where it may be firmly locked merely by screwing down the thumb nut 43. In thus locking the lower windshield section 28 in position the frame bracket 33 is frictionally and immovably held against the operating lever 35, and the latter is locked against rotation due to the wedging action of the interfitting cone members 45 and 46. In returning the lower windshield section to its seat the wing nuts are first loosened and then after the windshield section has been swung into place above the fence 26, the operating levers 35 are turned downwardly to the position shown in Fig. 2 and locked in position by screwing down the wing nuts 43.

From the foregoing it will be apparent that the present invention provides a simple and conveniently operable means for opening the lower windshield section the spring pressed member 47 and cooperating notch 48 yieldingly holding the operating lever in raised position, permitting the driver of the automobile to readily open the windshield while the car is in motion by raising one of the operating levers at a time. Another advantage of the present invention will be apparent from Figs. 2 and 4. It has been stated that the initial movement of the upper end of the lower windshield during opening is inwardly and also slightly upwardly. When the windshield is closed the movement is reversed so that the downturned lip 32 of the rubber strip 31 approaches the glass of the upper windshield section from a substantially horizontal direction thereby bending the lip 32 downwardly and into more firm contact with the glass of the upper windshield section. By thus moving the lower windshield section into place horizontally rather than vertically any tendency of the lip 32 to bend upwardly out of place is thus avoided.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed:

1. In a windshield for automobiles and the like, a body member, a frame member, a body bracket carried by the body member, a frame bracket carried by the frame member, a lever interposed between said brackets, interfitting cone-shaped wedge members non-rotatably connected respectively with said lever and one of said brackets, means for forcing the wedge members into locking engagement, and a yieldingly locking connection between said wedge members, said yieldingly locking connection including a spring pressed plunger and a cooperating depression in the cooperating cone surface of said cone shaped wedge members.

2. In a windshield for automobiles and the like, a body member, a frame member, a body bracket carried by the body member, a frame bracket carried by the frame member, said brackets having sockets formed in their adjacent faces, a lever interposed between the brackets and having eccentrically disposed bosses formed on opposite sides thereof and adapted to be received in said sockets, one of the sockets and the boss received therein having cooperating taper surfaces adapted to be forced together to lock the lever against rotation with respect to the bracket carrying the tapered boss, spring means for yieldingly holding the lever against rotation with respect to the last mentioned bracket when said lever is not locked against rotation in the tapered socket, and manually operable means for forcing the tapered boss and socket into locking engagement.

3. In a windshield for automobiles and the like, a body member, a frame member, a body bracket carried by the body member, a frame bracket carried by the frame member, said body bracket having a tapered socket formed in one face thereof, and said frame bracket having a cylindrical socket formed therein facing the socket in the body bracket, a lever interposed between the brackets and having eccentrically disposed bosses formed on opposite sides thereof corresponding in size and shape to said sockets and adapted to be received therein, manually operable means including a bolt passing through said lever and brackets for forcing said tapered socket and cooperating boss into frictional locking engagement with one another whereby to positively lock the lever against rotation with respect to the body bracket, and means operative when the lever is not positively locked to the body bracket for yieldingly locking said parts together, said last-mentioned means consisting of a spring pressed plunger and a cooperating depression carried in said cooperating boss and tapered socket, respectively.

In testimony whereof I hereto affix my signature.

FREDERICK A. DILLINGHAM.